US010739983B1

(12) United States Patent
Miriyala

(10) Patent No.: US 10,739,983 B1
(45) Date of Patent: Aug. 11, 2020

(54) CONFIGURATION AND MANAGEMENT OF SWIMLANES IN A GRAPHICAL USER INTERFACE

(71) Applicant: ServiceNow, Inc., Santa Clara, CA (US)

(72) Inventor: Venkatram Reddy Miriyala, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/380,784

(22) Filed: Apr. 10, 2019

(51) Int. Cl.
G06F 3/0484 (2013.01)
G06F 3/0486 (2013.01)

(52) U.S. Cl.
CPC ........ G06F 3/0486 (2013.01); G06F 3/04845 (2013.01)

(58) Field of Classification Search
CPC .......... G06F 3/048; G06F 13/26; G06F 17/00; G06T 11/20
See application file for complete search history.

(56) References Cited

U.S. PATENT DOCUMENTS

| | | | | |
|---|---|---|---|---|
| 5,884,306 A | * | 3/1999 | Bliss | G06F 3/0481 |
| 6,057,836 A | * | 5/2000 | Kavalam | G06F 3/0481 715/779 |
| 6,205,453 B1 | * | 3/2001 | Tucker | G06F 16/2272 715/202 |
| 6,920,555 B1 | | 7/2005 | Peters et al. | |
| 7,574,496 B2 | | 8/2009 | McCrory et al. | |
| 7,765,231 B2 | | 7/2010 | Rathus et al. | |
| 7,904,540 B2 | | 3/2011 | Hadad et al. | |
| 7,996,525 B2 | | 8/2011 | Stienhans et al. | |

(Continued)

FOREIGN PATENT DOCUMENTS

| | | |
|---|---|---|
| CN | 101493781 A | 7/2009 |
| JP | 2005234917 A | 9/2005 |

(Continued)

OTHER PUBLICATIONS

Miller, G., "Researchers pit local vs. cloud clusters in computer-intensive race", www.fiercebiotechnit.com, Aug. 30, 2010, 2 pgs.

(Continued)

Primary Examiner — Rashawn N Tillery
(74) Attorney, Agent, or Firm — Fletcher Yoder PC

(57) ABSTRACT

A server device may be configured to transmit, to a client device, data and program code that instructs the client device to display a graphical user interface using the data. The graphical user interface may include a plurality of parallel lanes that are displayed according to a logical ordering. The parallel lanes may contain handle components for dragging the lanes in a direction substantially perpendicular to the parallel lanes. The selection, dragging, and release of a handle component of a particular parallel lane may cause the graphical user interface to: (i) upon the selection, automatically collapse the parallel lanes, (ii) upon the dragging, slide the particular parallel lane among the set of collapsed parallel lanes, and (iii) upon the release, automatically expand the parallel lanes into a different logical ordering defined by where the particular parallel lane was released.

20 Claims, 13 Drawing Sheets

(56) References Cited

U.S. PATENT DOCUMENTS

| | | | |
|---|---|---|---|
| 8,108,855 | B2 | 1/2012 | Dias et al. |
| 8,190,740 | B2 | 5/2012 | Steinhans et al. |
| 8,239,526 | B2 | 8/2012 | Simpson et al. |
| 8,255,529 | B2 | 8/2012 | Ferris et al. |
| 8,572,623 | B2 | 10/2013 | Bhogal et al. |
| 8,656,018 | B1 | 2/2014 | Keagy et al. |
| 8,701,018 | B1* | 4/2014 | Keel ............ G06Q 10/10 715/751 |
| 9,035,949 | B1* | 5/2015 | Oberheu ............ G06T 11/206 345/440 |
| 9,348,650 | B2 | 5/2016 | Bhogal et al. |
| 10,572,412 | B1* | 2/2020 | Ward, Jr. ............ G06F 9/455 |
| 2005/0147950 | A1* | 7/2005 | Ortiz ............ G06Q 10/101 434/238 |
| 2005/0155033 | A1 | 7/2005 | Luoffo et al. |
| 2005/0193227 | A1 | 9/2005 | Nakahara et al. |
| 2006/0195715 | A1 | 8/2006 | Herington |
| 2006/0242164 | A1* | 10/2006 | Evans ............ G06F 16/168 |
| 2006/0251339 | A1 | 11/2006 | Gokturk et al. |
| 2007/0050697 | A1* | 3/2007 | Lewis-Bowen ............ G06F 40/18 715/212 |
| 2008/0163194 | A1 | 7/2008 | Dias et al. |
| 2009/0144393 | A1 | 6/2009 | Kudo |
| 2009/0175509 | A1 | 7/2009 | Gonion et al. |
| 2009/0293056 | A1 | 11/2009 | Ferris |
| 2009/0300607 | A1 | 12/2009 | Ferris et al. |
| 2009/0300608 | A1 | 12/2009 | Ferris et al. |
| 2010/0017801 | A1 | 1/2010 | Kundapur |
| 2010/0050172 | A1 | 2/2010 | Ferris |
| 2010/0058328 | A1 | 3/2010 | DeHaan |
| 2010/0114867 | A1 | 5/2010 | Olston |
| 2010/0191845 | A1 | 7/2010 | Ginzton |
| 2010/0211525 | A1* | 8/2010 | West ............ G06Q 40/00 705/36 R |
| 2010/0241734 | A1 | 9/2010 | Miyajima |
| 2010/0250744 | A1 | 9/2010 | Hadad et al. |
| 2010/0306377 | A1 | 12/2010 | DeHaan et al. |
| 2011/0082771 | A1* | 4/2011 | Pritikin ............ G06Q 30/0603 705/27.1 |
| 2011/0214123 | A1 | 9/2011 | Lublin et al. |
| 2011/0219372 | A1 | 9/2011 | Agrawal et al. |
| 2011/0225277 | A1 | 9/2011 | Freimuth et al. |
| 2011/0314466 | A1 | 12/2011 | Berg et al. |
| 2011/0321058 | A1 | 12/2011 | Schmidt |
| 2012/0005346 | A1 | 1/2012 | Burckart et al. |
| 2012/0042061 | A1 | 2/2012 | Ayala et al. |
| 2012/0054731 | A1 | 3/2012 | Aravamudan et al. |
| 2012/0084414 | A1 | 4/2012 | Brock et al. |
| 2012/0084445 | A1 | 4/2012 | Brock et al. |
| 2012/0180041 | A1 | 7/2012 | Fletcher |
| 2012/0180045 | A1 | 7/2012 | Bhogal et al. |
| 2013/0268837 | A1* | 10/2013 | Braithwaite ............ G06Q 10/10 715/234 |
| 2014/0007130 | A1 | 1/2014 | Bhogal et al. |
| 2014/0278460 | A1* | 9/2014 | Dart ............ G06Q 50/22 705/2 |

FOREIGN PATENT DOCUMENTS

| | | |
|---|---|---|
| JP | 2006244481 A | 9/2006 |
| JP | 20075188169 A | 7/2007 |
| JP | 2009134687 A | 6/2009 |

OTHER PUBLICATIONS

Bias, R., "Virtual Server vs. Real Server Disk Drive Speed", www.cloudscaling.com, Dec. 13, 2009, 5 pgs.

Fontana, J., "Microsoft melding view of local, cloud-based virtual machines", www. networkworld.com, Apr. 29, 2009; 2 pgs.

Maitland, J., "Keeping Control Isn't Easy", Chapter 4: Cloud-Based Infrastructure, SearchCloudComputing.com, Publication Date: Oct. 2009, 17 pgs.

Mell et al., "The NIST Definition of Cloud Computing", National Institute of Standards and Technology, Information technology Laboratory, Version 15, Oct. 7, 2009, 2 pgs.

Tanya NOVO_VERDE, International Search Report, International Application No. PCT/CA2012/050014, dated May 25, 2012, 4 pgs.

Kim et al., "Investigating the User of Autonomic Cloudbursts for High-Throughput Medical Image Registration", 10th IEEE/ACM International Conference on Grid Computer, 2009, pp. 34-41.

Nordin et al., "Cloud Resource Broker in the Optimization of Mdical Image Retrieval System", IEEE 2011, 5 pgs.

Schmidt et al., "Efficient Distribution of Virtual machines for Cloud Computing", IEEE 2010, 8 pgs.

Yang et al., "NIR: Content Based Image Retrieval on Cloud computing", IEEE 2009, 4 pgs.

Teets, Bradley A., USPTO Office Action, U.S. Appl. No. 13/004,049, dated Nov. 7, 2012, 23 pgs.

Teets, Bradley A., USPTO Final Office Action, U.S. Appl. No. 13/004,049, dated Mar. 1, 2013, 32 pgs.

Teets, Bradley A. USPTO Notice of Allowance and Fee(s) Due, U.S. Appl. No. 13/004,049, dated Jun. 20, 2013, 28 pgs.

Teets, Bradley A., U.S. Appl. No. 14/018,961, Office Action dated Aug. 31, 2015, 28 pgs.

Teets, Bradley A., U.S. Appl. No. 14/018,961, Notice of Allowance dated Feb. 29, 2016, 22 pgs.

* cited by examiner

700 — OBTAIN, FROM PERSISTENT STORAGE, DATA REPRESENTING: (I) A DEFINITION OF A PLURALITY OF CATEGORICAL GROUPS, (II) A PLURALITY OF INFORMATION ITEMS, EACH ASSOCIATED WITH ONE OF THE CATEGORICAL GROUPS, AND (III) A DEFINITION OF A LOGICAL ORDERING FOR THE CATEGORICAL GROUPS

710 — TRANSMIT, TO A CLIENT DEVICE, THE DATA AND PROGRAM CODE THAT INSTRUCTS THE CLIENT DEVICE TO GENERATE AND DISPLAY A GRAPHICAL USER INTERFACE, WHEREIN THE GRAPHICAL USER INTERFACE INCLUDES A PLURALITY OF PARALLEL LANES, RESPECTIVELY ASSOCIATED WITH THE CATEGORICAL GROUPS, DISPLAYED ACCORDING TO THE LOGICAL ORDERING, AND CONTAINING RESPECTIVE HANDLES FOR DRAGGING THE PARALLEL LANES IN A DIRECTION THAT IS SUBSTANTIALLY PERPENDICULAR TO THE PARALLEL LANES, WHEREIN EACH OF THE PARALLEL LANES ARE EITHER EXPANDED OR COLLAPSED, WHEREIN EXPANDED PARALLEL LANES DISPLAY RESPECTIVE SETS OF CARDS REPRESENTING THE INFORMATION ITEMS OF THEIR ASSOCIATED CATEGORICAL GROUPS, WHEREIN COLLAPSED PARALLEL LANES DO NOT DISPLAY THEIR RESPECTIVE SET OF CARDS, AND WHEREIN SELECTION, DRAGGING, AND RELEASE OF A HANDLE OF A PARTICULAR PARALLEL LANE CAUSES THE GRAPHICAL USER INTERFACE TO: (I) UPON THE SELECTION, AUTOMATICALLY COLLAPSE A SET OF THE PARALLEL LANES INCLUDING THE PARTICULAR PARALLEL LANE, (II) UPON THE DRAGGING, SLIDE THE PARTICULAR PARALLEL LANE AS COLLAPSED AMONG THE SET OF THE PARALLEL LANES AS COLLAPSED, AND (III) UPON THE RELEASE, AUTOMATICALLY EXPAND THE SET OF THE PARALLEL LANES INTO A DIFFERENT LOGICAL ORDERING DEFINED BY WHERE THE PARTICULAR PARALLEL LANE WAS RELEASED

FIG. 7

800 — RECEIVE, BY A CLIENT DEVICE AND FROM A SERVER DEVICE, DATA AND PROGRAM CODE THAT INSTRUCTS THE CLIENT DEVICE TO GENERATE AND DISPLAY A GRAPHICAL USER INTERFACE, WHEREIN THE DATA REPRESENTS: (I) A DEFINITION OF A PLURALITY OF CATEGORICAL GROUPS, (II) A PLURALITY OF INFORMATION ITEMS, EACH ASSOCIATED WITH ONE OF THE CATEGORICAL GROUPS, AND (III) A DEFINITION OF A LOGICAL ORDERING FOR THE CATEGORICAL GROUPS,

810 — GENERATE, AT THE CLIENT DEVICE, THE GRAPHICAL USER INTERFACE USING THE DATA, WHEREIN THE GRAPHICAL USER INTERFACE INCLUDES A PLURALITY OF PARALLEL LANES, RESPECTIVELY ASSOCIATED WITH THE CATEGORICAL GROUPS, DISPLAYED ACCORDING TO THE LOGICAL ORDERING, AND CONTAINING RESPECTIVE HANDLES FOR DRAGGING THE PARALLEL LANES IN A DIRECTION THAT IS SUBSTANTIALLY PERPENDICULAR TO THE PARALLEL LANES, AND WHEREIN EACH OF THE PARALLEL LANES ARE EITHER EXPANDED OR COLLAPSED, WHEREIN EXPANDED PARALLEL LANES DISPLAY RESPECTIVE SETS OF CARDS REPRESENTING THE INFORMATION ITEMS OF THEIR ASSOCIATED CATEGORICAL GROUP, WHEREIN COLLAPSED PARALLEL LANES DO NOT DISPLAY THEIR RESPECTIVE SET OF CARDS

820 — RECEIVE A SELECTION, BY THE CLIENT DEVICE, OF A HANDLE OF A PARTICULAR PARALLEL LANE, WHEREIN THE SELECTION CAUSES THE GRAPHICAL USER INTERFACE TO AUTOMATICALLY COLLAPSE A SET OF THE PARALLEL LANES INCLUDING THE PARTICULAR PARALLEL LANE

830 — RECEIVE A DRAG COMMAND, BY THE CLIENT DEVICE, WHEREIN THE DRAG COMMAND CAUSES THE GRAPHICAL USER INTERFACE TO SLIDE THE PARTICULAR PARALLEL LANE AS COLLAPSED AMONG THE SET OF THE PARALLEL LANES AS COLLAPSED

840 — RECEIVE A RELEASE COMMAND, BY THE CLIENT DEVICE, WHEREIN THE RELEASE COMMAND CAUSES THE GRAPHICAL USER INTERFACE AUTOMATICALLY EXPAND THE SET OF THE PARALLEL LANES INTO A DIFFERENT LOGICAL ORDERING DEFINED BY WHERE THE PARTICULAR PARALLEL LANE WAS RELEASED

FIG. 8

CONFIGURATION AND MANAGEMENT OF SWIMLANES IN A GRAPHICAL USER INTERFACE

BACKGROUND

Graphical user interfaces (GUIs) allow users to engage with software applications through graphical icons and visual indicators. Compared to text-based or command line user interfaces, which depend on users memorizing command words, GUIs provide an easy, less error prone approach for interacting with software applications. GUIs can take on many forms. Some GUIs may be, for instance, web-based GUIs that can be displayed a screen of a computing device.

In many circumstances, the arrangement of graphical elements within a GUI can be constrained by the software application. Users that want to modify the arrangement can submit a request to the developers of the software application who then may update the GUI layout. Yet, this process of updating the GUI may be overly time consuming, sometimes taking days or weeks. And since the arrangement of elements cannot be quickly adjusted, the ability for users to tailor the GUI layout to support their individual preferences may be limited.

SUMMARY

GUIs allow users to visually engage with software applications. Generally, users access GUIs by way of web-connected devices, though native GUIs may also be supported. These devices may include digital displays (e.g., monitors, screens, and so on) through which users can view and interact with the GUIs.

In some situations, a GUI may be configured with graphical lanes that represent categorical groupings of graphical elements on the GUI. For example, lanes can represent priorities associated with the graphical elements (high, medium, low, and so on). When displayed on the GUI, lanes may appear parallel in relation to each other and may be configured vertically (e.g., each lane parallel to the y-axis of the GUI) or horizontally (e.g., each lane parallel to the x-axis of the GUI). Each graphical element may be displayed on the GUI in a graphical lane that corresponds to the categorical group of the graphical element. As a result, graphical lanes can help communicate complex details, for example, graphical elements representing items of various priorities, through a simple visual representation.

Sometimes, a GUI configured with several graphical lanes may become too large to fit on a digital display. For example, if the GUI is larger than the physical size of the digital display, then only a portion of the GUI may be viewed on the digital display. And as a result, a user may be unable to view relevant information on the GUI. Instead, the user may have to scroll through and/or otherwise interact with the GUI to find relevant information. While the GUI may eventually provide the relevant information the user looking for, the process of finding the information may be unduly time consuming.

To address this issue, the GUI could be designed with an option to rearrange the ordering of graphical lanes. As an example, if a user finds an "in progress" lane to be highly relevant, the user could rearrange the lanes to ensure that the "in progress" lane can always be viewed, regardless of size of the GUI and/or digital display. Such option could be configurable on a per user basis, allowing a user of the GUI to rearrange the ordering of graphical lanes without affecting the ordering of another user's arrangement. Continuing from the previous example, if a different user finds a "done" lane to be highly relevant, the different user could rearrange the lanes to ensure that the "done" lane can always be viewed.

In an example implementation, the GUI can be configured with a reordering technique to modify the order of a particular lane. To begin the reordering, a user may select or otherwise activate a handle component located within or associated with the particular lane. Upon this selection, the graphical lanes of the GUI may "collapse", thereby not displaying the graphical elements within each graphical lane. Advantageously, because the graphical elements no longer occupy space on the digital display, a greater number of graphical lanes can be viewed when collapsed, providing the user with a more comprehensive view of the ordering of many (or all) of the graphical lanes.

After the graphical lanes are collapsed, the user can drag/slide, via the handle component, the particular lane about the GUI and into a new position. Then, in response to the user releasing the handle component of the particular lane, the graphical lanes of the GUI may "expand", thereby displaying the graphical elements within each graphical lane. Notably, the expanded lanes can be in a different ordering that is defined by where the particular lane was released.

Advantageously, the embodiments herein provide a single "click and drag" mechanism that allows a user to position the particular lane into any location on the GUI, saving users significant time in rearranging the graphical lanes. As such, the embodiments herein provide an improved reordering mechanism that allows users to quickly rearrange GUIs to support their individual needs. Other advantages and improvements are possible and will be appreciated from the discussion herein.

Accordingly, a first example embodiment may involve persistent storage containing data representing: (i) a definition of a plurality of categorical groups, (ii) a plurality of information items, each associated with one of the categorical groups, and (iii) a definition of a logical ordering for the categorical groups. The first example embodiment may also involve a server device configured to transmit, to a client device, the data and program code that instructs the client device to generate and display a graphical user interface using the data. The graphical user interface may include a plurality of parallel lanes, respectively associated with the categorical groups, displayed according to the logical ordering, and containing respective handle components for dragging the parallel lanes in a direction that is substantially perpendicular to the parallel lanes, where each of the parallel lanes are either expanded or collapsed, where expanded parallel lanes display respective sets of cards representing the information items of their associated categorical groups, and where collapsed parallel lanes do not display their respective set of cards. The graphical user interface may also be configured such that the selection, dragging, and release of a handle component of a particular parallel lane of the plurality of parallel lanes causes the graphical user interface to: (i) upon the selection, automatically collapse a set of the parallel lanes including the particular parallel lane, (ii) upon the dragging, slide the particular parallel lane as collapsed among the set of the parallel lanes as collapsed, and (iii) upon the release, automatically expand the set of the parallel lanes into a different logical ordering defined by where the particular parallel lane was released.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 is a flow chart, in accordance with example embodiments.

FIG. 8 is a flow chart, in accordance with example embodiments.

DETAILED DESCRIPTION

Figure 1:
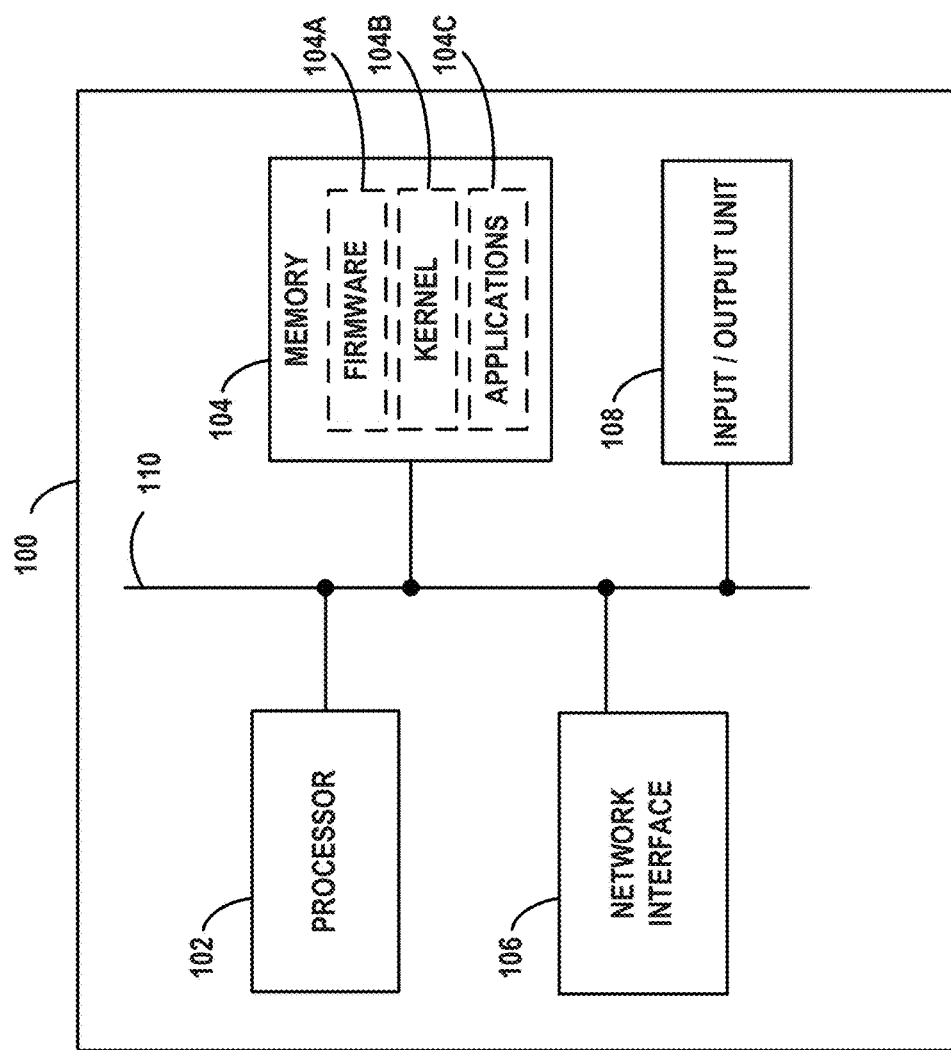
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
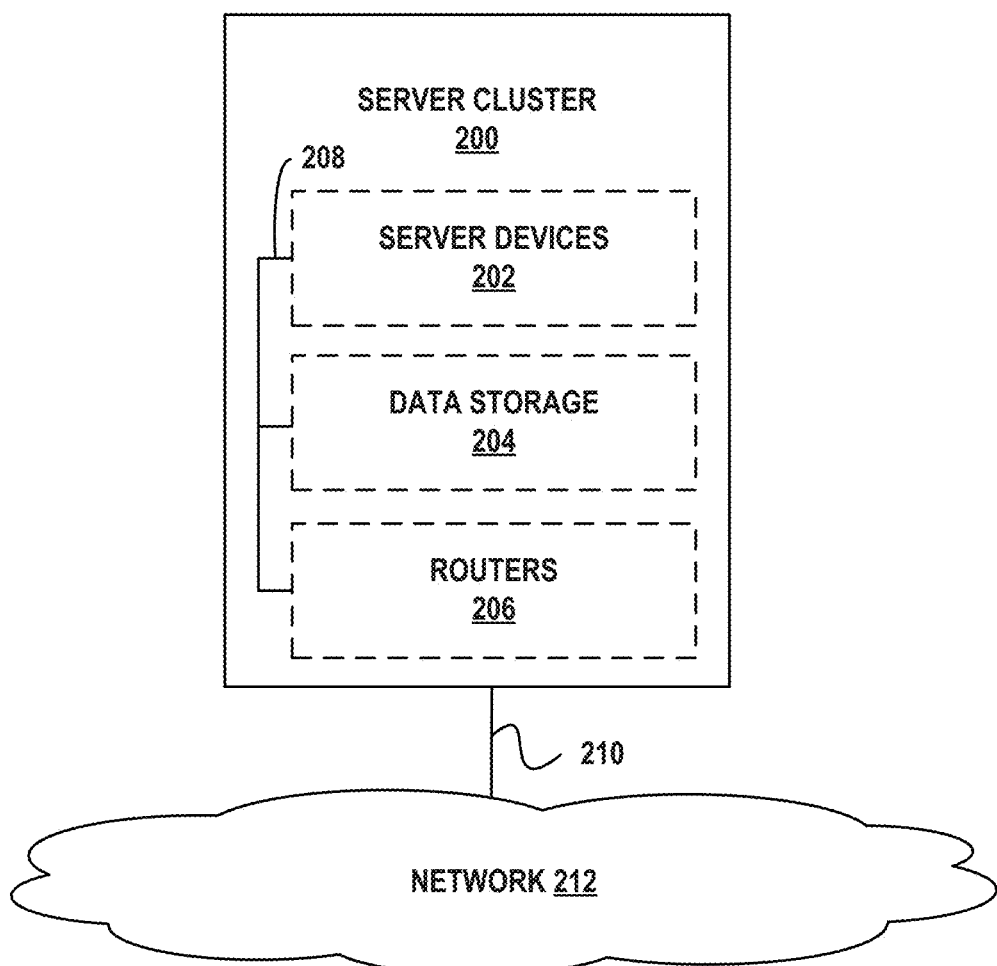
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
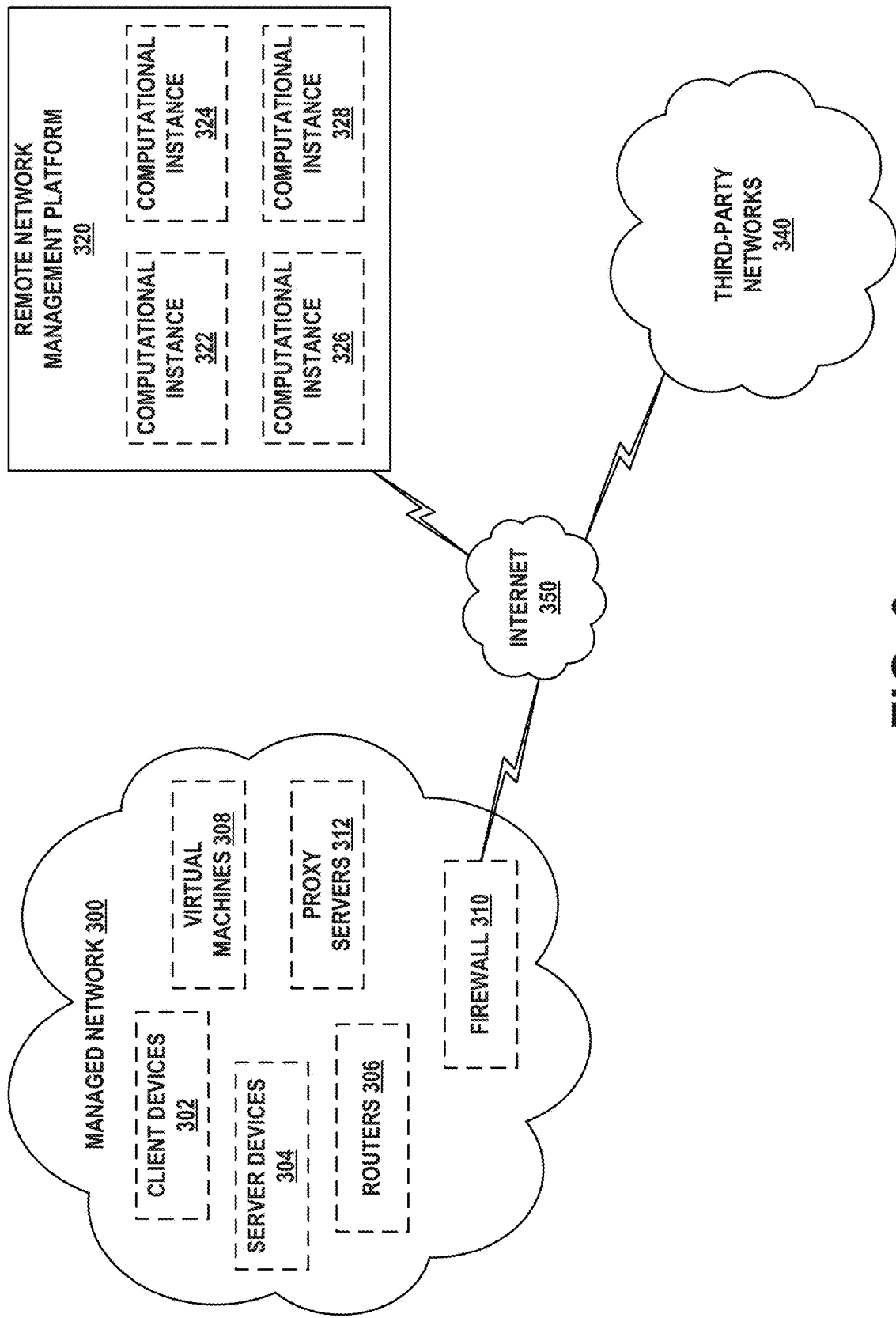
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
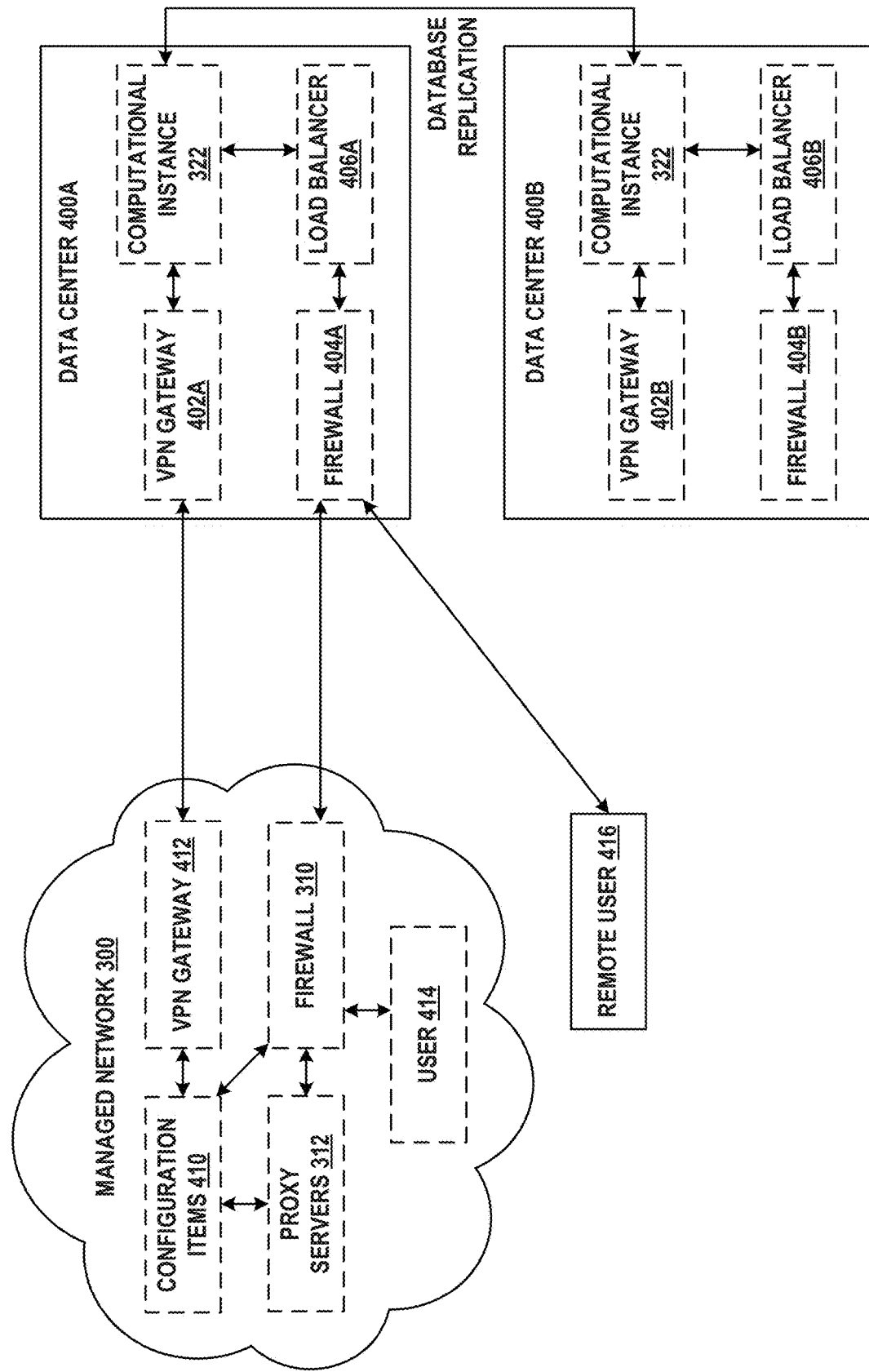
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
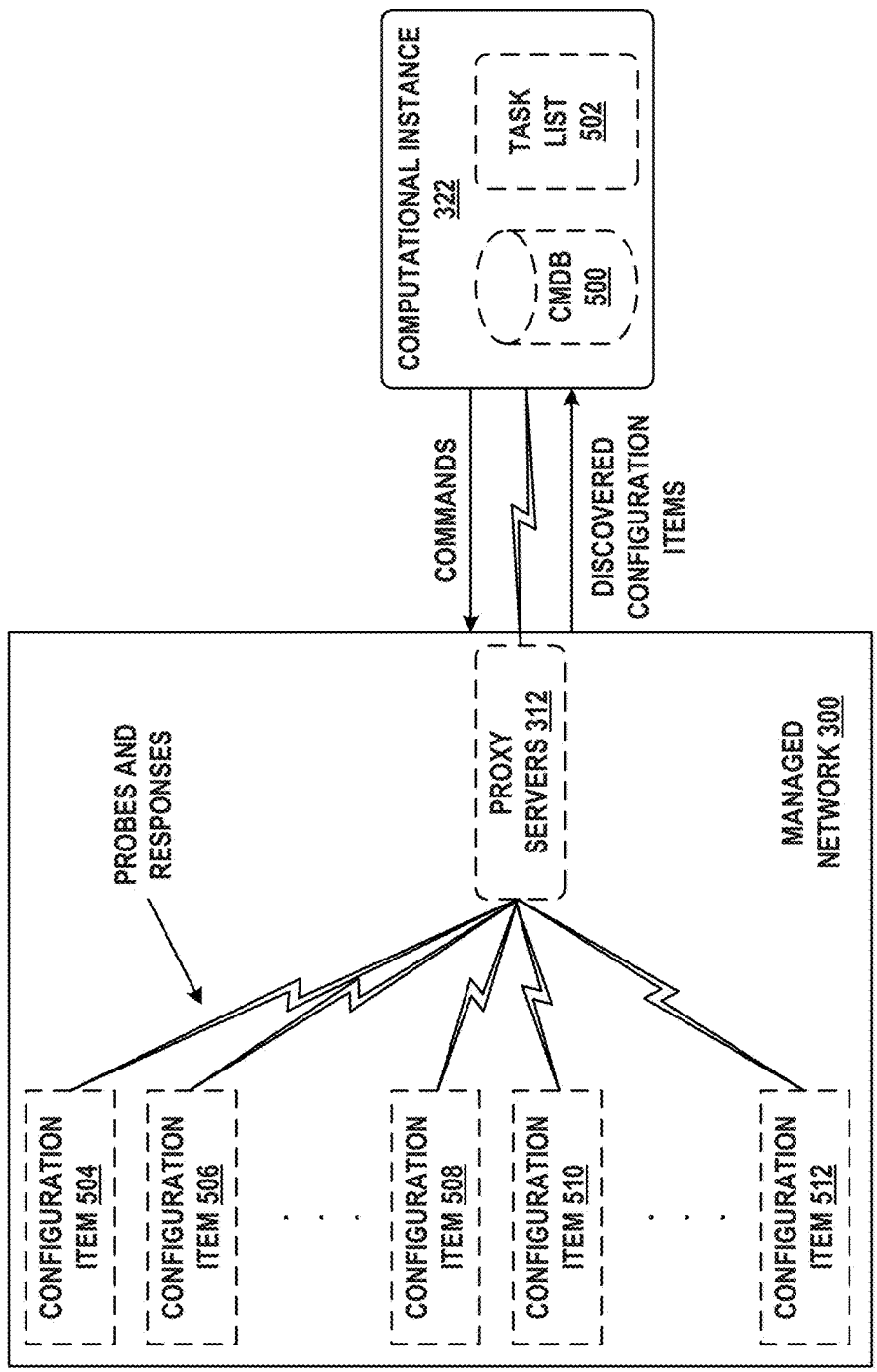
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
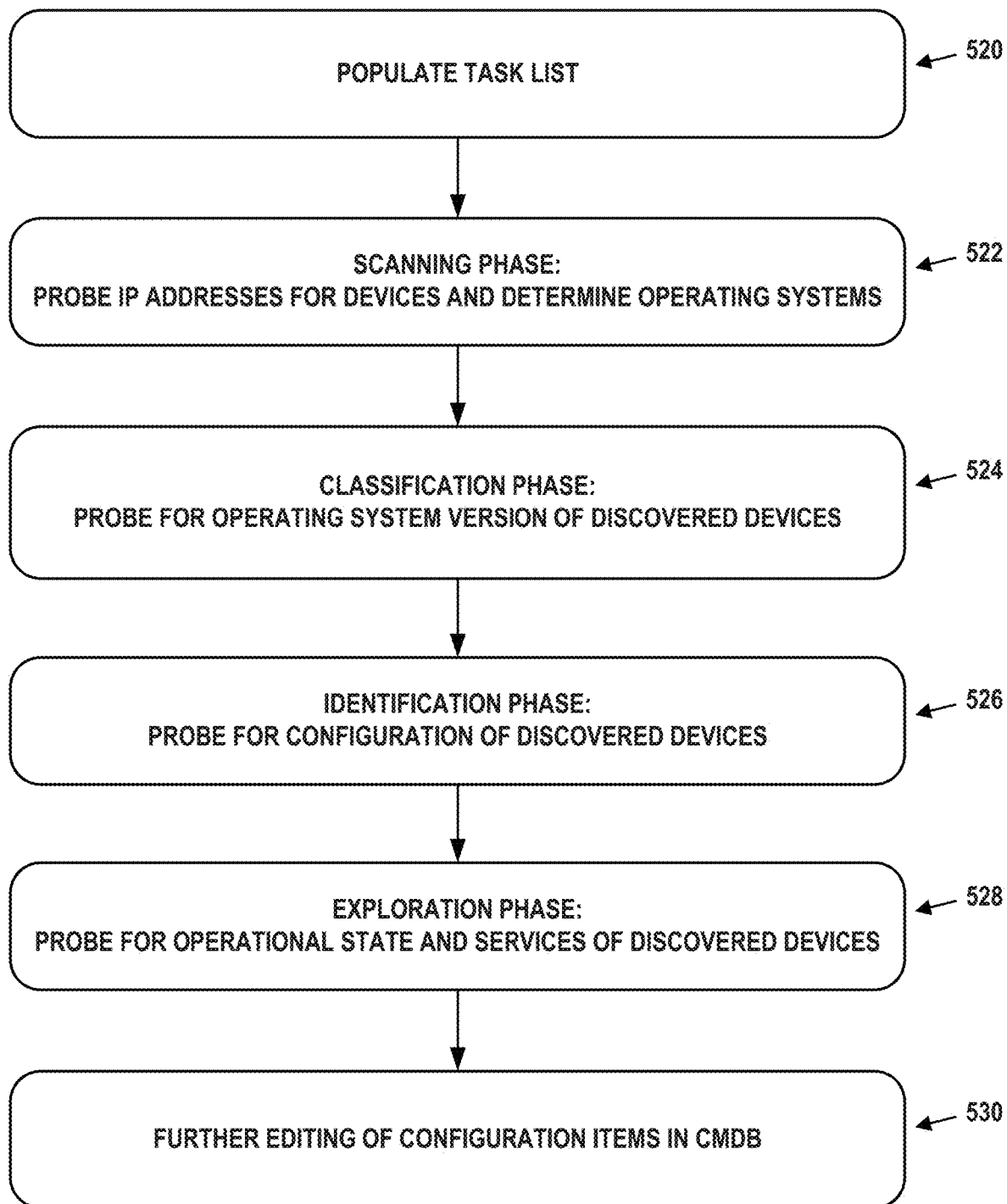
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. IMPROVED GRAPHICAL LANE MANAGEMENT

As described herein, the term "information items" may refer to data associated with managed network 300 and/or computational instance 322. For example, information items may include tasks that are to be completed by the entity associated with managed network 300, computational resources utilized by managed network 300, and so on. Within a GUI, information items may be represented as graphical elements, or herein referred to as "cards". As also described herein, "parallel lanes" may be GUI components that can be used to structure the display of cards within a GUI. The GUIs and/or parallel lanes described herein may be provided to users when they access a computational instance on a remote network management platform, such as computational instance 322 within remote network management platform 320 as described in FIG. 3.

As previously described, if a GUI contains a large enough number of parallel lanes, then only a portion of the GUI can be viewed on a digital display. And as a result, the process of finding relevant information on the GUI may be unduly time consuming for users. The embodiments herein address these limitations with a reordering technique that can modify the order of a particular parallel lane. As a result of these embodiments, users can be provided with an intuitive procedure to quickly redesign a GUI to support their individual requirements. An example GUI 600 is shown in FIGS. 6A, 6B, 6C, 6D, and 6E. As illustrated by the description below, the variation of GUI 600 from FIG. 6A to FIG. 6E can represent how a user can modify the ordering of a particular parallel lane in GUI 600.

Moreover, while the embodiments herein may be discussed in connection with GUIs related with task management applications, information items that represent tasks, and parallel lanes that represent categories of those tasks, these are used solely as a convenient conceptual representation and are not intended to be limiting with respect to example embodiments or techniques described herein. In practice, the embodiments or techniques described herein can be applied across a wide variety of scenarios that involve GUIs with parallel lanes and graphical elements (e.g., cards, containers, or widgets) disposed within those parallel lanes.

Figure 6A:
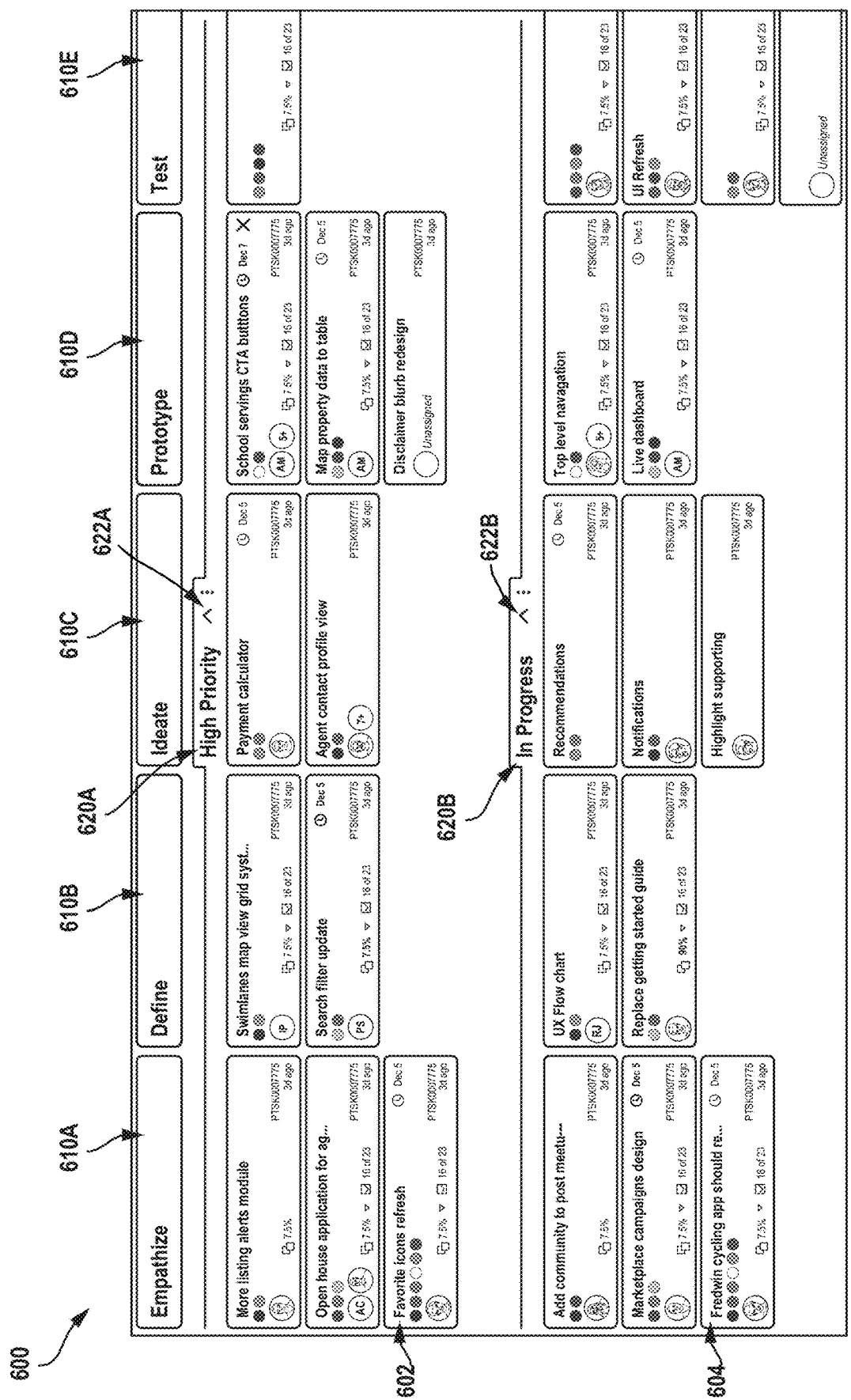
FIG. 6A depicts a view of GUI with expanded parallel lanes, in accordance with example embodiments.

FIG. 6A depicts a view of GUI 600 with expanded parallel lanes, in accordance with example embodiments. GUI 600 of FIG. 6A includes cards 602 and 604, headers 610A, 610B, 610C, 610D, and 610E, parallel lanes 620A and 620B, and handle components 622A and 622B.

Cards 602 and 604 may be visual user interface elements that represent information items. In particular, cards 602 and 604 may be two cards of a plurality of cards on GUI 600. The data used to populate cards 602 and 604 may be stored, for example, in persistent storage on computational instance 322 and provided to the user upon requesting GUI 600.

Cards 602 and 604 may display the caption/title of the information items that they represent. For example, card 602 may be titled "Favorite icons refresh" and card 604 may be titled "Fredwin cycling app should re . . . ," (where GUI 600 omits the remaining part of the caption/title for brevity). Additionally, cards 602 and 604 can display metrics, such as the date the card was created, users assigned to the card, and so on.

Headers 610A-610E may represent a status of an information item. For example, given that information items can represent tasks that are to be completed by the entity associated with managed network 300, the status (e.g., empathize, define, ideate, prototype, and test) may specify the progress towards the completion of the task. The data to (i) define the statuses and (ii) to associate each information item with a status may be stored, for example, in persistent storage on computational instance 322 and provided to the user upon requesting GUI 600.

As shown in FIG. 6A, each card on GUI 600 may be aligned with a header that corresponds to a status associated with the card. For instance, both card 602 and 604 may be aligned with header 610A, indicating that the information items represented by the card 602 and 604 have an "empathize" status. Cards on GUI 600 may be restricted from being aligned with more than one header at once.

In operation, the alignment of cards with headers 610A-610E may be uniform across all users of GUI 600. That is, each user of GUI 600 may observe an identical ordering of headers 610A-610E and an identical alignment of cards with headers 610A-610E. For instance, card 602 may be in alignment with header 610A across all users of GUI 600. And in the event that card 602 becomes aligned with a different header, for example, header 610B, computational instance 322 may be configured to (i) receive information regarding this change and (ii) update GUI 600 to display the new alignment across all users of GUI 600.

Parallel lanes 620A and 620B may be graphical lanes that represent categorical groupings of cards on the GUI 600. For example, parallel lanes 620A and 620B can represent priorities (high, medium, low, and so on), and/or departments (e.g., marketing, HR, finance, and so on). Similarly to headers 610A-610E, the data to (i) define the categorical groups and (ii) to associate each information item with a categorical group, may be stored, for example, in persistent storage on computational instance 322 and provided to the user upon requesting GUI 600.

As shown in FIG. 6A, each card on GUI 600 may be located within a parallel lane that corresponds to a categorical group associated with the card. For instance, card 602 may be located in parallel lane 620A, indicating that the information item represented by card 602 is in a "high priority" categorical group, whereas card 604 may be located in parallel lane 620B, indicating that information item represented by card 604 is an "in progress" categorical group. Cards on GUI 600 may be restricted from being located in more than one categorical group at once.

In operation, the order of parallel lanes 620A and 620B may be defined on a per user basis. That is, each user of GUI 600 may rearrange the ordering of parallel lanes 620A and 620B without affecting the ordering of another user's arrangement. For instance, one user may arrange for parallel lane 620A to be located above parallel lane 620B, while another user may arrange for parallel lane 620B to be located above parallel lane 620A. And in the event that a particular user reorders parallel lanes 620A and 620B, computational instance 322 may be configured to receive information regarding this change and may store the information as a logical ordering associated with that particular user. Then, if the particular user makes an additional request to computational instance 322 for GUI 600, the stored logical ordering of parallel lanes 620A and 620B for the particular user will be displayed. Advantageously, this property can allow users of GUI 600 to customize their own display of GUI 600.

In line with the discussion above, each parallel lane may contain a handle component to allow users to drag the parallel lane into a new position on GUI 600. For example, parallel lane 620A contains handle component 622A and parallel lane 620B contains handle component 622B. In some cases, parallel lanes 620A and 620B can be parallel to the x-axis of GUI 600 and draggable, via handle components 622A and 622B, along a direction substantially perpendicular to the x-axis of GUI 600. In other cases (not shown), parallel lanes 620A and 620B can be parallel to the y-axis of GUI 600 and draggable, via handle components 622A and 622B, along a direction substantially perpendicular to the y-axis of GUI 600. As used herein, the term "substantially" can mean being largely, but not wholly of what is specified. For example, "a direction substantially perpendicular" can mean a direction that is completely perpendicular (i.e., at a 90 degree angle) or a direction that is more perpendicular than not (e.g., at an 80-100 degree angle or a 50-130 degree angle).

Similarly, each card on GUI 600 may also contain a handle component (not shown) that allows users to (i) drag the card from one parallel lane into another parallel lane and/or (ii) drag the card from being aligned with one header to being aligned with another header. For example, if the information item represented by card 604 becomes high priority, the user can drag card 604 from parallel lane 620B to parallel lane 620A. And as another example, if the information item represented by card 604 is to receive a "define" status, the user can drag card 604 from being aligned with header 610A to being aligned with header 610B. In practice, dragging a card on GUI 600 can involve a user (i) selecting (or otherwise activating) a handle component located within the card, (ii) dragging/sliding, via the handle component, the card among the plurality of cards of GUI 600, and (iii) releasing the card into alignment with a different header and/or parallel lane. Once the card is released, the resulting header/parallel lane of the card may be transmitted to persistent storage on computational instance 322.

Figure 6B:
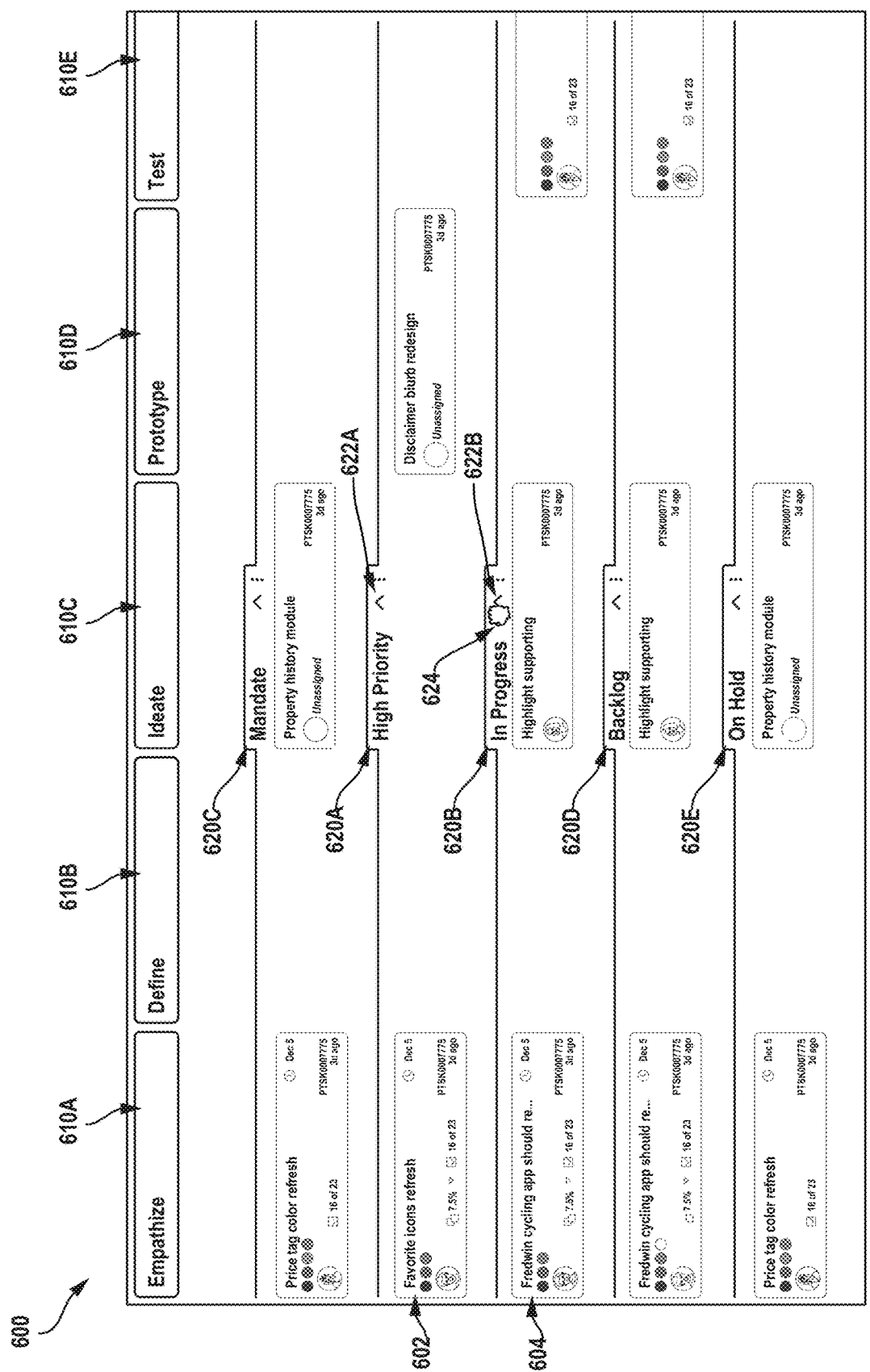
FIG. 6B depicts a view of a GUI with semi-collapsed parallel lanes, in accordance with example embodiments.

FIG. 6B depicts a view of GUI 600 with semi-collapsed parallel lanes, in accordance with example embodiments. The view of FIG. 6B may be displayed, for example, when a user initially selects and begins to drag handle component 622B of parallel lane 620B, as illustrated by drag icon 624. GUI 600 of FIG. 6B includes the same cards 602 and 604, headers 610A, 610B, 610C, 610D, and 610E, parallel lanes 620A and 620B, and handle components 622A and 622B as FIG. 6A, but also includes parallel lanes 620C, 620D and 620E and drag icon 624, which are not shown in FIG. 6A.

As may be seen by comparing FIG. 6A to FIG. 6B, the initial selection and dragging of parallel lane 620B can alter the view of GUI 600. In particular, FIG. 6A illustrates a view of GUI 600 with expanded parallel lanes whereas FIG. 6B illustrates a view of GUI 600 with semi-collapsed parallel lanes. As used herein, "semi-collapsed" parallel lanes may refer to parallel lanes that display only a portion of their respective set of cards, whereas "expanded" parallel lanes may refer to parallel lanes that display more cards than semi-collapsed parallel lanes, perhaps displaying all of their respective set of cards.

Transitioning from expanded parallel lanes to semi-collapsed parallel lanes may be beneficial to users of GUI 600. Because they no longer display the complete set of cards, the semi-collapsed parallel lanes of FIG. 6B may be substantially narrower than the expanded parallel lanes of FIG. 6A, allowing for a greater total number of parallel lanes to be displayed on GUI 600. For example, parallel lanes 620C-620E, which could not be previously viewed in FIG. 6A, can now be viewed in FIG. 6B. Advantageously, users of GUI 600 may now have a more comprehensive view of many (or all) of the parallel lanes available on GUI 600, which can provide greater insight into the lanes available for repositioning. Other benefits are also possible.

Moreover, recall that as used herein the term "substantially" can mean being largely, but not wholly of what is specified. For example, "substantially narrower" parallel lanes can refer to parallel lanes that are more than 50% narrower their expanded size. Or, "substantially narrower" parallel lanes can refer parallel lanes that are more than 10% narrower of their expanded size. Other examples are also possible.

Figure 6C:
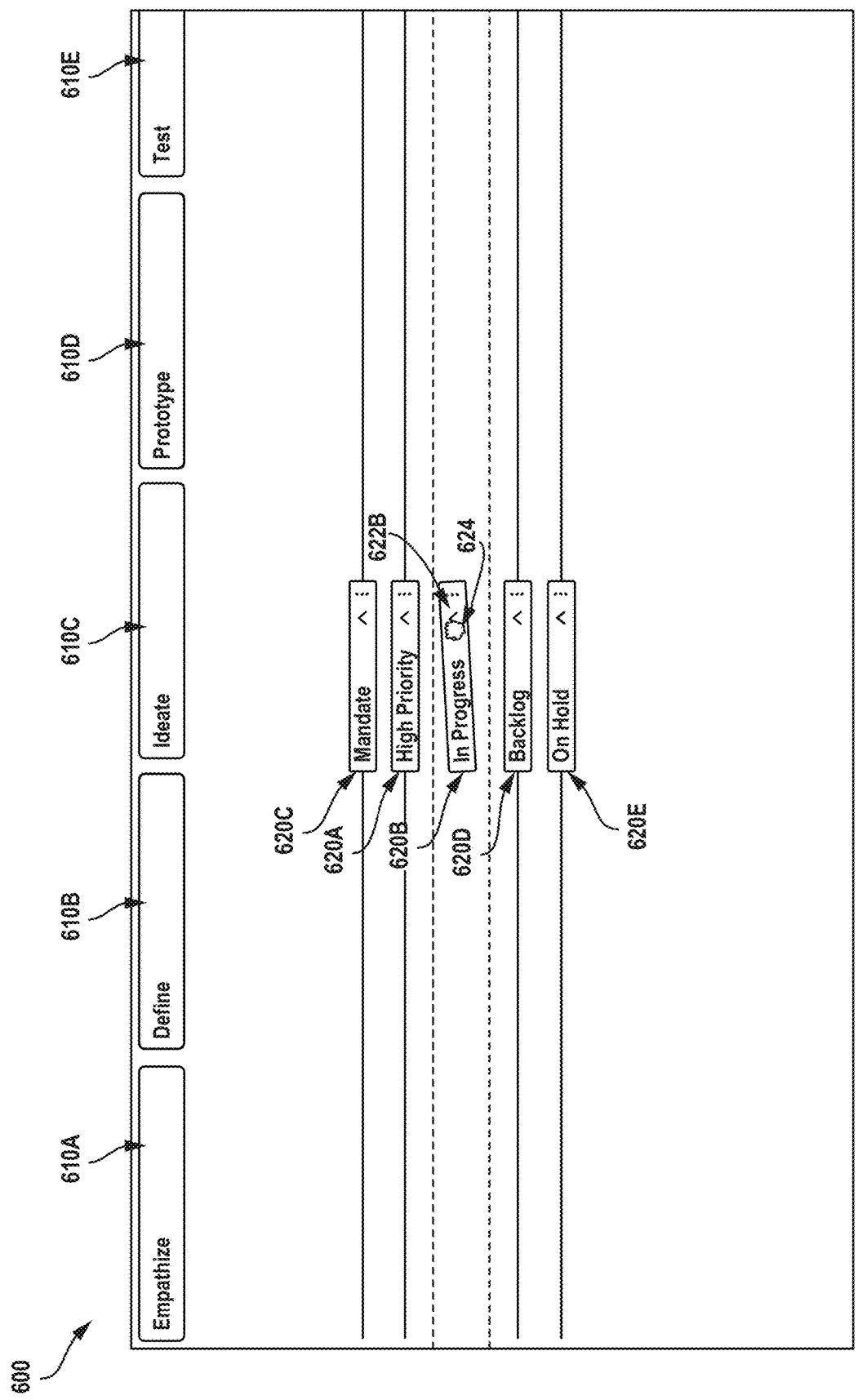
FIG. 6C depicts a view of GUI with collapsed parallel lanes, in accordance with example embodiments.

FIG. 6C depicts a view of GUI 600 with collapsed parallel lanes, in accordance with example embodiments. The view of FIG. 6C may be displayed, for example, when the user continues to drag handle component 622B of parallel lane 620B such that cards are no longer displayed on GUI 600. This continued dragging is illustrated by drag icon 624. GUI 600 of FIG. 6C includes the same headers 610A, 610B, 610C, 610D, and 610E, parallel lanes 620A, 620B, 620C, 620D, and 620E, handle component 622B, and drag icon 624 as FIG. 6B. However, GUI 600 in FIG. 6C does not display cards 602 and 604, which are now hidden in from view. Also note that handle component 622A is omitted from FIG. 6C for purpose of brevity.

As may be seen by comparing FIG. 6C to FIG. 6B, the continued dragging of parallel lane 620B can further alter the view of GUI 600. In particular, FIG. 6C illustrates a view of GUI 600 with collapsed parallel lanes. As used herein, "collapsed" parallel lanes may refer to parallel lanes that do not display their respective set of cards. Once the parallel lanes are collapsed, a user may be able to modify the position of parallel lane 620B by dragging handle component 622B towards the current position of another parallel lane. For example, if the user drags handle component 622B downward, the position of parallel lane 620B and 620D may switch. And if the user drags handle component 622B upward, the position of parallel lane 620B and 620A may switch.

Figure 6D:
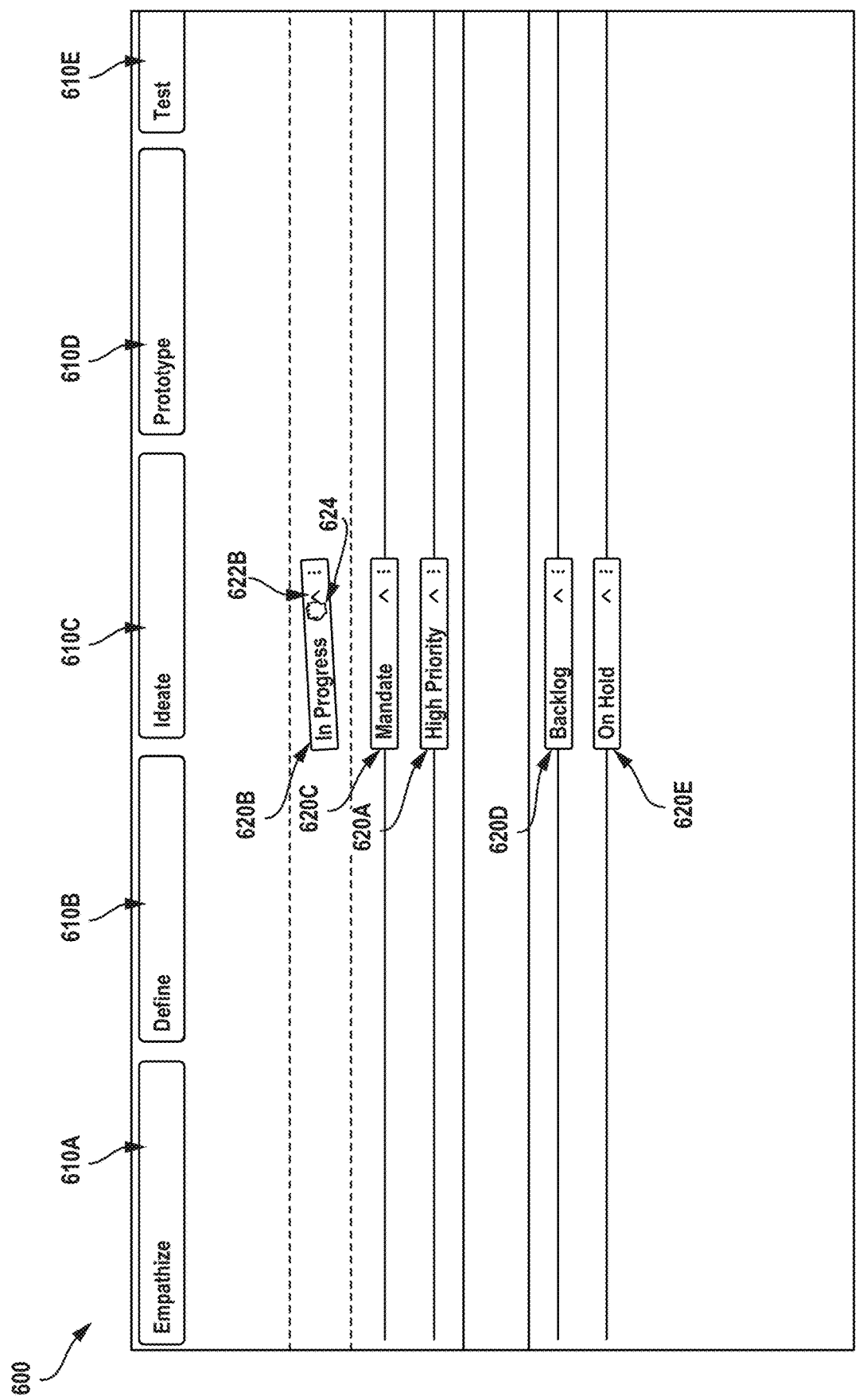
FIG. 6D depicts a view of a GUI with reordered parallel lanes, in accordance with example embodiments.

FIG. 6D depicts a view of GUI 600 with reordered parallel lanes, in accordance with example embodiments. The view of FIG. 6D may be displayed, for example, when a user drags the handle component 622B of parallel lane 620B above parallel lanes 620C and 620A. Such dragging is further illustrated with drag icon 624. GUI 600 of FIG. 6D includes the same headers 610A, 610B, 610C, 610D, and 610E, parallel lanes 620A, 620B, 620C, 620D, and 620E, handle component 622B, and drag icon 624 as FIG. 6C.

As may be seen by comparing FIG. 6D to FIG. 6C, the position of parallel lane 620B has been reordered by the user. By dragging handle component 622B above parallel lanes 620C and 620A, the user has reordered the position of parallel lane 620B. At this point, the user may choose to release the handle component 622B of parallel lane 620B.

Figure 6E:
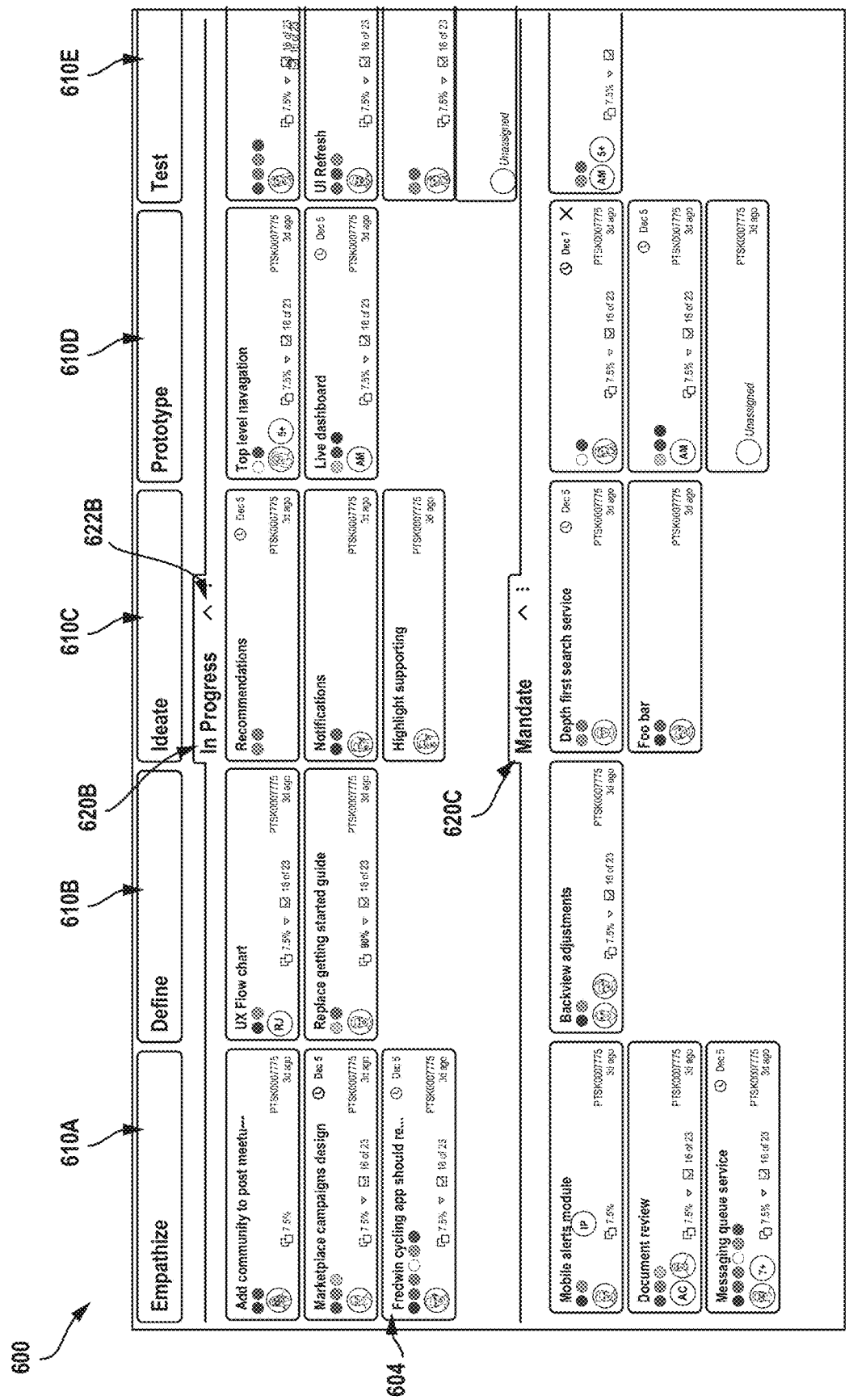
FIG. 6E depicts a view of a GUI with expanded and reordered parallel lanes, in accordance with example embodiments.

FIG. 6E depicts a view of GUI 600 with reordered and expanded parallel lanes, in accordance with example embodiments. The view of FIG. 6E may be displayed, for example, when a user releases the handle component 622B of parallel lane 620B after positioning parallel lane 620B above parallel lanes 620C and 620A. GUI 600 of FIG. 6E includes the same headers 610A, 610B, 610C, 610D, and 610E, parallel lanes 620B and 620C, and handle component 622B as FIG. 6D, but also includes card 604, which is not displayed in FIG. 6D. However, GUI 600 in FIG. 6E does not parallel lanes 620A, 620D, and 620E or drag icon 624, which are now hidden from view.

As may be seen by comparing FIG. 6E to FIG. 6D, the release of handle component 622B can cause the parallel lanes of GUI 600 to automatically expand and display their respective sets of cards in accordance with the new ordering. For example, parallel lane 620B, which contains card 6044, is now located at the top of GUI 600 and above parallel lane 620C. At this point, the user can decide to reorder another parallel lane, for example, parallel lane 620C or can decide, for the time being, to cease reordering parallel lanes.

VI. EXAMPLE OPERATIONS

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 involves obtaining, from persistent storage, data representing: (i) a definition of a plurality of categorical groups, (ii) a plurality of information items, each associated with one of the categorical groups, and (iii) a definition of a logical ordering for the categorical groups.

Block 710 involves transmitting, to a client device, the data and program code that instructs the client device to generate and display a graphical user interface using the data. The graphical user interface includes a plurality of parallel lanes, respectively associated with the categorical groups, displayed according to the logical ordering, and containing respective handle components for dragging the parallel lanes in a direction that is substantially perpendicular to the parallel lanes. Additionally, each of the parallel lanes are either expanded or collapsed, where expanded parallel lanes display respective sets of cards representing the information items of their associated categorical groups, and where collapsed parallel lanes do not display their respective set of cards. The graphical user interface is also be configured such that the selection, dragging, and release of a handle component of a particular parallel lane of the plurality of parallel lanes causes the graphical user interface to: (i) upon the selection, automatically collapse a set of the parallel lanes including the particular parallel lane, (ii) upon the dragging, slide the particular parallel lane as collapsed among the set of the parallel lanes as collapsed, and (iii) upon the release, automatically expand the set of the parallel lanes into a different logical ordering defined by where the particular parallel lane was released.

In some embodiments, the set of the parallel lanes is the plurality of parallel lanes.

In some embodiments, the logical ordering for the categorical groups is per-user, and displaying the plurality of parallel lanes is according to the per-user logical ordering.

In some embodiments, the plurality of parallel lanes are parallel to an x-axis of the graphical user interface and draggable along a y-axis of the graphical user interface.

In some embodiments, the plurality of parallel lanes are parallel to a y-axis of the graphical user interface and draggable along an x-axis of the graphical user interface.

In some embodiments, the plurality of parallel lanes also contain respective toggles for collapsing and expanding the parallel panes.

In some embodiments, the collapsed parallel lanes are substantially narrower than the expanded parallel lanes.

In some embodiments, the persistent storage further contains a definition of a plurality of statuses, each of the information items associated with respective statuses from the plurality of statuses, and the graphical user interface includes a plurality of headers, respectively associated with the statuses, and the parallel lanes, when expanded, are configured to display cards in the respective sets of cards in alignment with a header from the plurality of headers that represents the status associated with the information items of the cards.

In some embodiments, the cards in the respective sets of cards are draggable, and the dragging and release of a particular card in one of the sets of cards causes the graphical user interface to: (i) upon the dragging, slide the particular card among the respective sets of cards, and (ii) upon the release, automatically associate the information item represented by the particular card with a different categorical group or a different status defined by whichever parallel lane and/or header in which the particular card was released.

In some embodiments, the plurality of headers are defined across users, and displaying each card in the respective sets of cards in alignment with the header that represents the status associated with the information item of the card is done across users.

FIG. 8 is a flow chart illustrating a second example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 involves receiving, by a client device and from a server device, data and program code that instructs the client device to generate and display a graphical user interface using the data, where the data represents: (i) a definition of a plurality of categorical groups, (ii) a plurality of information items, each associated with one of the categorical groups, and (iii) a definition of a logical ordering for the categorical groups.

Block 810 involves generating, at the client device, the graphical user interface using the data, where the graphical user interface includes a plurality of parallel lanes, respectively associated with the categorical groups, displayed according to the logical ordering, and containing respective handle components for dragging the parallel lanes in a direction that is substantially perpendicular to the parallel lanes. Additionally, each of the parallel lanes are either expanded or collapsed, where expanded parallel lanes display respective sets of cards representing the information items of their associated categorical group, and where collapsed parallel lanes do not display their respective set of cards.

Block 820 involves receiving a selection, by the client device, of a handle component of a particular parallel lane of the plurality of parallel lanes, where the selection causes the graphical user interface to automatically collapse a set of the parallel lanes including the particular parallel lane.

Block 830 involves receiving a drag command, by the client device, where the drag command causes the graphical user interface to slide the particular parallel lane as collapsed among the set of the parallel lanes as collapsed Block 840 involves receiving a release command, by the client device, where the release command causes the graphical user interface automatically expand the set of the parallel lanes into a different logical ordering defined by where the particular parallel lane was released.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage containing data representing: (i) a definition of a plurality of categorical groups, (ii) a plurality of information items, each associated with one of the categorical groups, and (iii) a definition of a logical ordering for the categorical groups; and
    a server device configured to transmit, to a client device, the data and program code that instructs the client device to generate and display a graphical user interface using the data,
    wherein the graphical user interface includes a plurality of parallel lanes, respectively associated with the categorical groups, displayed according to the logical ordering, and containing respective handle components for dragging the parallel lanes in a direction that is substantially perpendicular to the parallel lanes,
    wherein each of the parallel lanes are either expanded or collapsed, wherein expanded parallel lanes display respective sets of cards representing the information items of their associated categorical groups, wherein collapsed parallel lanes do not display their respective set of cards, and
    wherein selection, dragging, and release of a handle component of a particular parallel lane of the plurality of parallel lanes causes the graphical user interface to: (i) upon the selection, automatically collapse a set of the parallel lanes including the particular parallel lane, (ii) upon the dragging, slide the particular parallel lane as collapsed among the set of the parallel lanes as collapsed, and (iii) upon the release, automatically expand the set of the parallel lanes into a different logical ordering defined by where the particular parallel lane was released.

2. The system of claim 1, wherein the set of the parallel lanes is the plurality of parallel lanes.

3. The system of claim 1, wherein the logical ordering for the categorical groups is per-user, and wherein displaying the plurality of parallel lanes is according to the per-user logical ordering.

4. The system of claim 1, wherein the plurality of parallel lanes are parallel to an x-axis of the graphical user interface and draggable along a y-axis of the graphical user interface.

5. The system of claim 1, wherein the plurality of parallel lanes are parallel to a y-axis of the graphical user interface and draggable along an x-axis of the graphical user interface.

6. The system of claim 1, wherein the plurality of parallel lanes also contain respective toggles for collapsing and expanding the parallel lanes.

7. The system of claim 1, wherein the collapsed parallel lanes are substantially narrower than the expanded parallel lanes.

8. The system of claim 1, wherein the persistent storage further contains a definition of a plurality of statuses, each of the information items associated with respective statuses from the plurality of statuses, wherein the graphical user interface includes a plurality of headers, respectively associated with the statuses, and wherein the parallel lanes, when expanded, are configured to display cards in the respective sets of cards in alignment with a header from the plurality of headers that represents the status associated with the information items of the cards.

9. The system of claim 8, wherein the cards in the respective sets of cards are draggable, and wherein dragging and release of a particular card in one of the sets of cards causes the graphical user interface to: (i) upon the dragging, slide the particular card among the respective sets of cards, and (ii) upon the release, automatically associating the information item represented by the particular card with a different categorical group or a different status defined by whichever parallel lane and/or header in which the particular card was released.

10. The system of claim 8, wherein the plurality of headers are defined across users, and wherein displaying cards in the respective sets of cards in alignment with the header that represents the status associated with the information item of the card is done across users.

11. A computer-implemented method comprising:
obtaining, from persistent storage, data representing: (i) a definition of a plurality of categorical groups, (ii) a plurality of information items, each associated with one of the categorical groups, and (iii) a definition of a logical ordering for the categorical groups; and
transmitting, to a client device, the data and program code that instructs the client device to generate and display a graphical user interface using the data, wherein the graphical user interface includes a plurality of parallel lanes, respectively associated with the categorical groups, displayed according to the logical ordering, and containing respective handle components for dragging the parallel lanes in a direction that is substantially perpendicular to the parallel lanes, wherein each of the parallel lanes are either expanded or collapsed, wherein expanded parallel lanes display respective sets of cards representing the information items of their associated categorical groups, wherein collapsed parallel lanes do not display their respective set of cards, and wherein selection, dragging, and release of a handle component of a particular parallel lane causes the graphical user interface to: (i) upon the selection, automatically collapse a set of the parallel lanes including the particular parallel lane, (ii) upon the dragging, slide the particular parallel lane as collapsed among the set of the parallel lanes as collapsed, and (iii) upon the release, automatically expand the set of the parallel lanes into a different logical ordering defined by where the particular parallel lane was released.

12. The computer-implemented method of claim 11, wherein the set of the parallel lanes is the plurality of parallel lanes.

13. The computer-implemented method of claim 11, wherein the logical ordering for the categorical groups is per-user, and wherein displaying the plurality of parallel lanes is according to the per-user logical ordering.

14. The computer-implemented method of claim 11, wherein the plurality of parallel lanes are parallel to an x-axis of the graphical user interface and draggable along a y-axis of the graphical user interface.

15. The computer-implemented method of claim 11, wherein the plurality of parallel lanes are parallel to a y-axis of the graphical user interface and draggable along an x-axis of the graphical user interface.

16. The computer-implemented method of claim 11, wherein the plurality of parallel lanes also contain respective toggles for collapsing and expanding the parallel lanes.

17. The computer-implemented method of claim 11, wherein the collapsed parallel lanes are substantially narrower than the expanded parallel lanes.

18. The computer-implemented method of claim 11, wherein the persistent storage further contains a definition of a plurality of statuses, each of the information items associated with respective statuses from the plurality of statuses, wherein the graphical user interface includes a plurality of headers, respectively associated with the statuses, and wherein the parallel lanes, when expanded, are configured to display cards in the respective sets of cards in alignment with a header from the plurality of headers that represents the status associated with the information items of the cards.

19. The computer-implemented method of claim 18, wherein the plurality of headers are defined across users, and wherein displaying cards in the respective sets of cards in alignment with the header that represents the status associated with the information item of the card is done across users.

20. A computer-implemented method comprising:
receiving, by a client device and from a server device, data and program code that instructs the client device to generate and display a graphical user interface using the data, wherein the data represents: (i) a definition of a plurality of categorical groups, (ii) a plurality of information items, each associated with one of the categorical groups, and (iii) a definition of a logical ordering for the categorical groups;
generating, at the client device, the graphical user interface using the data, wherein the graphical user interface includes a plurality of parallel lanes, respectively associated with the categorical groups, displayed according to the logical ordering, and containing respective handle components for dragging the parallel lanes in a direction that is substantially perpendicular to the parallel lanes, and wherein each of the parallel lanes are either expanded or collapsed, wherein expanded parallel lanes display respective sets of cards representing the information items of their associated categorical group, wherein collapsed parallel lanes do not display their respective set of cards;

receiving a selection, by the client device, of a handle component of a particular parallel lane, wherein the selection causes the graphical user interface to automatically collapse a set of the parallel lanes including the particular parallel lane;

receiving a drag command, by the client device, wherein the drag command causes the graphical user interface to slide the particular parallel lane as collapsed among the set of the parallel lanes as collapsed; and receiving a release command, by the client device, wherein the release command causes the graphical user interface automatically expand the set of the parallel lanes into a different logical ordering defined by where the particular parallel lane was released.

* * * * *